United States Patent [19]

Strange

[11] Patent Number: 4,505,293

[45] Date of Patent: Mar. 19, 1985

[54] FLUID FLOW CONTROL VALVE

[75] Inventor: Victor E. Strange, Shirley, England

[73] Assignee: BL Technology Limited, United Kingdom

[21] Appl. No.: 433,010

[22] Filed: Oct. 6, 1982

[30] Foreign Application Priority Data

Oct. 10, 1981 [GB] United Kingdom ............. 8130665

[51] Int. Cl.³ ............................................ G05D 16/10
[52] U.S. Cl. ................................................. 137/117
[58] Field of Search ............... 137/117, 116, 115, 501

[56] References Cited

U.S. PATENT DOCUMENTS

| 2,942,619 | 6/1960 | Jackson | 137/501 |
|---|---|---|---|
| 3,532,106 | 10/1970 | Greune et al. | 137/117 |
| 3,636,970 | 1/1972 | Griffith et al. | 137/117 |
| 4,286,615 | 9/1981 | Stumpp et al. | 137/117 |
| 4,302,937 | 12/1981 | Aubert | 137/116 |
| 4,343,324 | 8/1982 | Ohe et al. | 137/117 |
| 4,400,938 | 8/1983 | Ohe | 137/117 |

FOREIGN PATENT DOCUMENTS

| 1185387 | 11/1958 | Fed. Rep. of Germany . |
|---|---|---|
| 2648707 | 10/1976 | Fed. Rep. of Germany . |
| 1285145 | 1/1969 | United Kingdom . |
| 1193773 | 6/1970 | United Kingdom . |
| 1269724 | 4/1972 | United Kingdom . |
| 1515715 | 8/1974 | United Kingdom . |

Primary Examiner—Martin P. Schwadron
Assistant Examiner—James R. Shay
Attorney, Agent, or Firm—Hayes, Davis & Soloway

[57] ABSTRACT

A valve which is arranged to output from a passage 12 a substantially constant-rate flow of fluid, notwithstanding changes in the flow rate entering the valve by passage 11, is arranged to provide an output from passage 12 which is variable with the static pressure in that passage. Thus when the valve is used to supply a controlled flow to a hydraulic control system an increased flow rate to the system is provided to compensate for increased leakage in the system resulting from a higher static pressure in the system.

5 Claims, 1 Drawing Figure

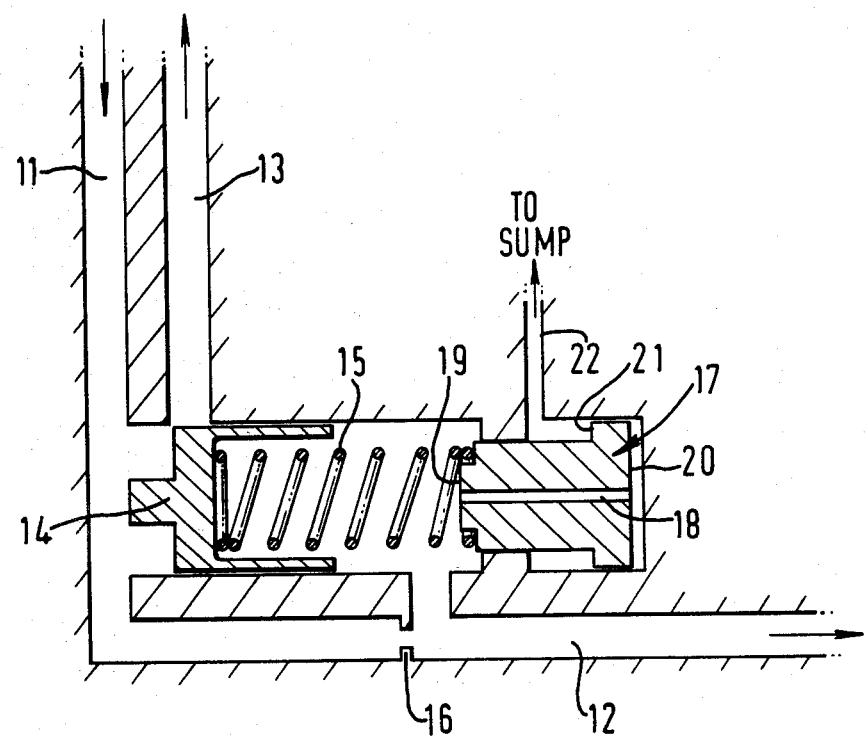

FLUID FLOW CONTROL VALVE

This invention relates to fluid flow control valves, and in particular to valves arranged to pass a constant flow rate of fluid under given circumstances.

Such valves are known in hydraulic control systems wherein it is a requirement that the control valves and actuators be fed fluid at a substantially constant rate to ensure normal operation of the system, notwithstanding that the overall system pressure may vary, by reason of the change of flow resistance of the system, for example. It is common however, for such systems to have a significant leakage rate which varies with the system pressure. To counteract this and ensure that the control system always has sufficient flow to function correctly the control valve is often arranged to provide at all times a flow rate sufficient to meet the requirements of the system under the worst possible leakage conditions. This results in an unnecessarily high flow rate under other leakage conditions and disadvantageously to unwanted pumping losses.

According to the invention there is provided a fluid flow control valve comprising a moveable wall subject to a biasing force and to an opposing force caused by a pressure difference which is proportional to the rate of flow of fluid in a passageway, and an outlet for bleeding fluid from a location upstream of said passageway, the flow resistance of said outlet being variable in accordance with the position of said wall whereby said flow rate is maintained substantially constant when the static pressure is constant, and wherein the arrangement is such that the said flow rate is proportional to the static pressure.

Thus the flow rate will be increased to deal with increased leakage at high static pressures and decreased to avoid unnecessary pumping losses when the leakage is less.

An embodiment of the invention will now be described with reference to the accompanying drawing which shows schematically a fluid flow control valve in accordance with the invention.

Oil at a variable pressure passes to the valve along an inlet passageway 11, and leaves the valve at a controlled flow rate through outlet passageway 12. A bleed passageway 13 carries the surplus flow from the inlet to a lubricating circuit (not shown) for lubricating machinery controlled by a hydraulic control circuit of which the illustrated valve forms a part.

The surplus flow of oil in passageway 13 diverted from the controlled flow in passage 12, is controlled by a piston 14. Piston 14 constitutes a moveable wall subject to a biasing force from a spring 15 and an opposing force created by the pressure difference across the wall, which is in effect the pressure difference across a flow constriction 16. Since the pressure difference across flow constriction 16 is proportional to the flow rate through it and along outlet passage 12, it follows that for a given spring biasing force the piston 14 will move in response to variations in the flow rate to bleed a greater or lesser amount of the flow into passage 13 whereby to maintain the flow rate constant in passage 12. It will be appreciated that the value of the constant flow rate maintained will be proportional to the spring force.

Spring 15 is seated on a free, stepped piston 17 which has a passage 18 connecting one face 19 with a larger-area face 20 at the other end of the piston. The difference in areas between faces 19 and 20 is equal to the area of an annular face 21. Face 21 is subject to a constant, low, pressure by way of a connection through passage 22 to the sump (not shown) of the hydraulic system, while faces 19 and 20 are subject to the system pressure in passage 12. Because of the difference in areas between faces 19 and 20, the piston 17 is biased by a force proportional to the static pressure in the system, and exerts a corresponding force on spring 15. The biasing force exerted by spring 15 on the flow controlling piston 14 is thus proportional to the static pressure so that the flow rate in outlet passage 12 is proportional to the static pressure in the controlled flow therein.

It will be appreciated therefore, that when the hydraulic control system (not shown) downstream of the illustrated valve is subject to increased leakage due to an increase in static pressure, the flow rate of fluid to the system will be increased to compensate for the leakage flow. Because the increased flow rate is not maintained under low pressure conditions, unnecessary pumping losses in the fluid supply are avoided.

It will be appreciated that considerable variation in the illustrated arrangement is possible within the scope of the invention. For example, piston 17 could be dispensed with and piston 14 replaced by a stepped differential piston similar to piston 17. The large and small end faces (equivalent to faces 20 and 19 respectively) would then be subject to the respective pressures in passages 12 and 11, while the annular area would be subject to the sump pressure. Again, the flow rate could be made variable with the static pressure by making the flow constriction 16 of variable flow resistance. If the constriction were arranged to have a reduced flow resistance with increasing static pressure, for example by having a deformable gas filled constriction which would be compressed by the static pressure, a greater flow would result for a given pressure difference across the piston with increasing pressure. The flow resistance of the constriction could of course be altered by varying the cross sectional area, or by streamlining the constriction.

Moreover a pressure difference proportional to the flow rate could be produced by other than the simple throttle type constriction shown. For example a streamlined flow constriction could be provided, with a low pressure tapping being taken at the point of minimum cross-sectional area. Such an arrangement would have the advantage of reduced pumping losses.

I claim:

1. Fluid control valve comprising: a passageway for fluid flow; means for generating a pressure difference proportional to the rate of flow of fluid through said passageway; an outlet for bleeding fluid from a location upstream of said passageway; a first wall member which is movable to vary the flow resistance of said outlet; resilient means for applying a biasing force to said first movable wall member, said first movable wall member also being subject to said pressure difference in opposition to said biasing force, whereby the flow resistance of said outlet is varied to maintain the flow rate through said passageway substantially constant when the static pressure is constant; and a further wall member which is subect over at least part of its area to a pressure difference proportional to the static pressure downstream of said pressure difference generating means, said further wall member acting on said resilient means and being movable under said pressure difference proportional to the static pressure to vary the biasing force on said first movable wall member, whereby the flow rate through said passageway is maintained proportional to the static pressure, wherein said further movable wall member has different areas of each of its faces exposed to static pressure.

2. Fluid flow control valve according to claim 1, wherein said means for generating a pressure difference comprises a constriction, said pressure difference being derived from the flow past said constriction.

3. Hydraulic control system subject to leakage proportional to the static pressure of fluid in the system, including a fluid flow valve according to claim 1.

4. A hydraulic control system subject to leakage proportional to the static pressure of fluid in the system, including a fluid flow valve according to claim 1.

5. Hydraulic control system according to claim 4, wherein said fluid flow control valve is located upstream of said leakage.

* * * * *

UNITED STATES PATENT AND TRADEMARK OFFICE
CERTIFICATE OF CORRECTION

PATENT NO. : 4,505,293

DATED : March 19, 1985

INVENTOR(S) : Victor E. Strange

It is certified that error appears in the above-identified patent and that said Letters Patent is hereby corrected as shown below:

On the title page "5 Claims" should read --4 Claims--.

Column 4, delete claim 3.

Signed and Sealed this

Sixth Day of August 1985

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,506,293

DATED : March 19, 1985

INVENTOR(S) : Robert Norman Hurst, Jr.

It is certified that error appears in the above-identified patent and that said Letters Patent is hereby corrected as shown below:

Column 1, line 15, "horizontally" should be --horizontally--.

Column 6, line 43, Claim 2, "supplied" should be --applied--.

Column 6, line 55, Claim 2, after "hue-dependent" insert --control of the contours within each horizontal line.--.

Column 8, line 38, Claim 12, "ocntrol" should be --control--.

Signed and Sealed this

Twenty-seventh Day of August 1985

[SEAL]

Attest:

DONALD J. QUIGG

Attesting Officer

Acting Commissioner of Patents and Trademarks